Nov. 27, 1928.

L. E. HANKISON ET AL 1,693,273

PRESSURE REGULATOR

Filed April 25, 1924    2 Sheets-Sheet 1

INVENTOR.
Lewis E. Hankison
and Wesley M. Stephens
BY
Green & McCallister
their ATTORNEYS.

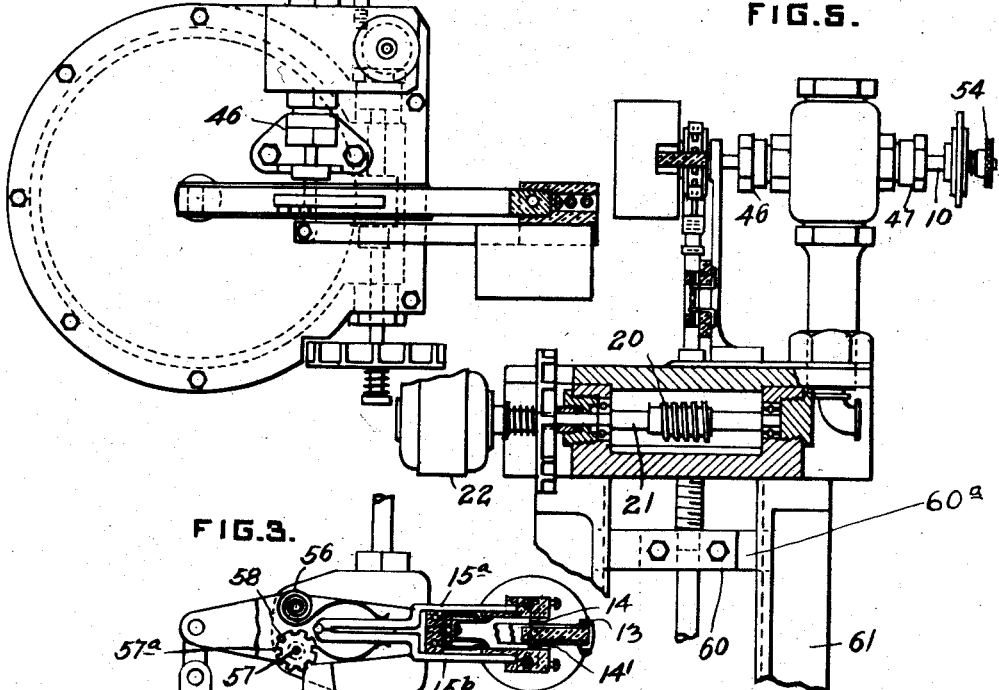

Patented Nov. 27, 1928.

1,693,273

UNITED STATES PATENT OFFICE.

LEWIS E. HANKISON, OF PITTSBURGH, AND WESLEY M. STEPHENS, OF CHESWICK, PENNSYLVANIA; SAID STEPHENS ASSIGNOR TO SAID HANKISON.

PRESSURE REGULATOR.

Application filed April 25, 1924. Serial No. 708,910.

This invention relates to pressure regulators or to means for maintaining a constant relation between a regulable fluid pressure and a variable fluid pressure.

An object of the invention is to provide simple and effective apparatus for controlling the operation of a fluid-delivery device in such a way as to maintain a substantially constant relation between the pressure delivered by that device and a pressure which may be variable.

This and other objects which will be made more apparent throughout the further description of the invention is obtained by means of apparatus embodying the features herein described and illustrated in the drawings accompanying and forming a part hereof.

In the drawings, Figure 1 is a diagrammatic view of apparatus embodying the invention shown in connection with a wiring diagram.

Fig. 3 is a view partially in section illustrating details of the apparatus disclosed in Fig. 1 which have been employed in a commercial form of apparatus.

Fig. 4 is a plan view of the apparatus shown in Fig. 3; and

Fig. 5 is a partial sectional view illustrating details of construction of the apparatus shown in Figs. 3 and 4.

Fig. 6 is a diagrammatic view, partly in section, illustrating one manner of employing the apparatus in connection with an alarm signal.

Figures 1, 2:
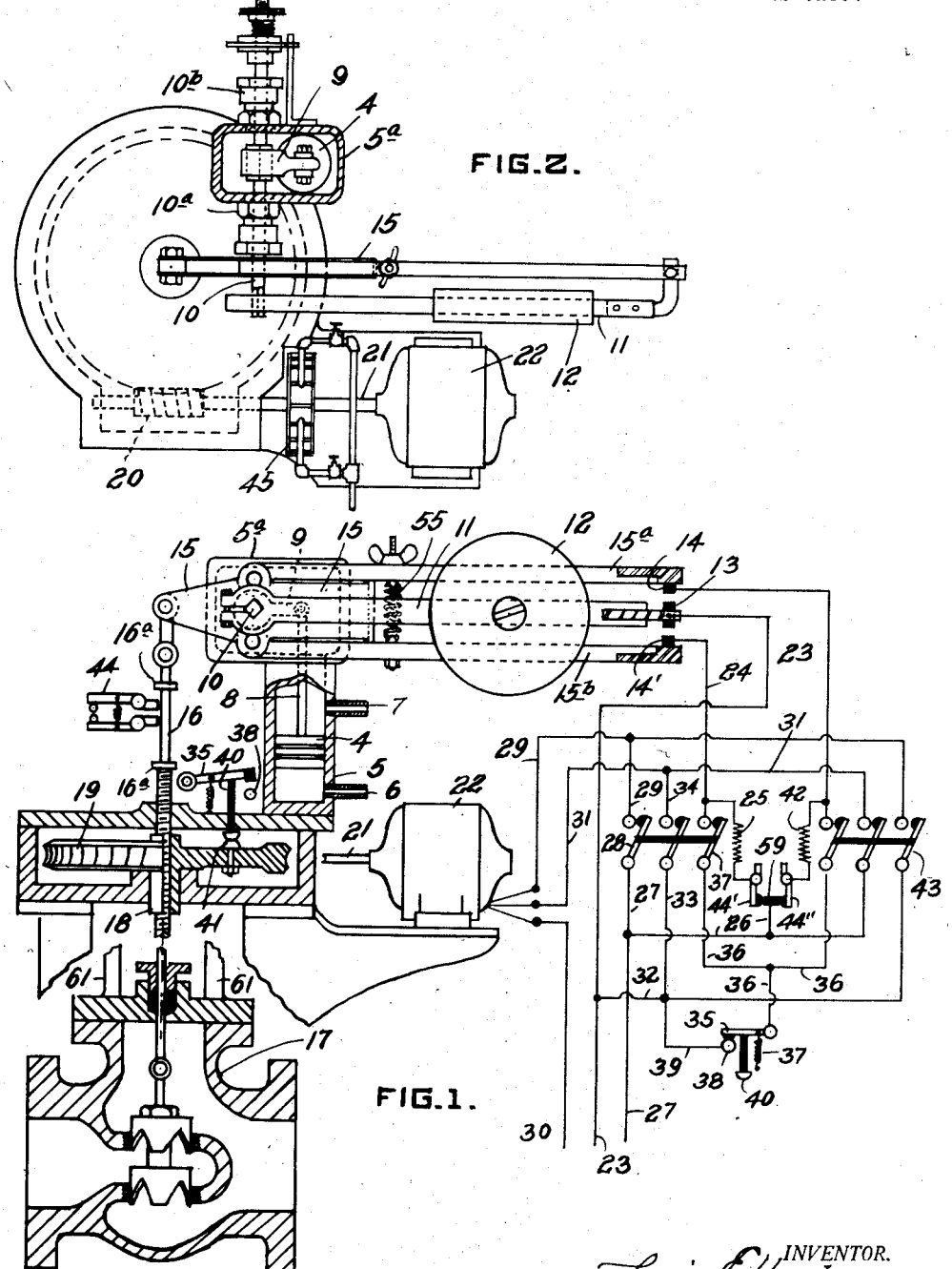
Fig. 2 is a diagrammatic plan view of the apparatus shown in Fig. 1, a portion being broken away for convenience of illustration.

In furnace and boiler control it is sometimes desirable to regulate the pressure of a fluid in accordance with variations in the pressure of another fluid. For example, it is highly desirable, if not absolutely essential, to regulate the pressure of the feed water introduced into boiler so as to maintain a substantially constant relation between it and the steam pressure generated by the boiler. Experience has demonstrated that the supply of feed water should be maintained at a pressure, which exceeds the pressure of the steam generated by the boiler, a predetermined amount, so as to not only insure the delivery of feed water to the boiler, in response to the operation of automatic apparatus, but also to insure the closing off of the supply of the feed water when the water within the boiler has attained the desired level. For this reason, the apparatus, when employed for the purpose of controlling the pressure of the feed water may be termed an excess pressure regulator, since its function there is to maintain the feed water at a predetermined excess pressure over the steam pressure. The invention, however, has a broader application and throughout the specification and claims we have employed the term "fluid" in its broad sense, i. e., to include both gases and liquids.

The apparatus illustrated as an embodiment of the invention consists essentially of a movable element subjected on one side to the fluid pressure to be regulated, and on the other side, to a pressure which varies in response to variations in operating conditions of such apparatus as a steam boiler. The movable member is so associated and combined that its movement, in response to variations on the opposing pressures, is controlled by adjustable means which, in effect, supplement or augment the force of the controlling fluid pressure acting on the movable member. The movements of the member in turn actuate an instrumentality, in the disclosure, an arm, which directly controls the source of the pressure to be regulated, but, under such conditions that the effectiveness of the arm as a controlling instrumentality is varied by the movement of the apparatus controlled.

In the drawings, we have illustrated the invention as embodied in apparatus adapted to be employed for regulating the delivery pressure of feed water. It will, however, be apparent that the invention is of such character that apparatus embodying it may be employed for the purpose of regulating any fluid pressure for the purpose of maintaining a constant relation between it and some other pressure, either variable or constant.

A regulating piston 4 is located within a cylinder 5, which is provided at one end with a port 6 through which the piston is subjected to the pressure to be regulated. The other end of the cylinder is provided with a port 7 through which a controlling fluid pressure is admitted to the cylinder. Where the apparatus is employed for the purpose of regulating the pressure of the feed water and maintaining it at a predetermined pressure above boiler pressure, the pressure of the feed water is introduced into the cylinder 5 through the port 6 and the pressure of the steam from the boiler is introduced through the port 7. Under such conditions, the piston is subjected on one side of the fluid pressure to be regulated and on the other side to what may be termed the controlling fluid pressure. As illustrated, the cylinder is a vertical cylinder and the piston moves up and down in response to variations in pressure within the cylinder. The piston rod 8 is operatively coupled by means of a lever arm 9 and a ball joint to a rotatable shaft 10. This shaft extends horizontally and is mounted in suitable bearings which may be rigidly associated with the cylinder 5. An arm 11 is rigidly secured to the shaft 10 so that it turns with the shaft in response to movements of the piston 4. This arm carries a weight 12 which may be adjustable along the arm and which supplements or augments the effective pressure of the controlling fluid introduced through the port 7 of the cylinder 5. The free end of the arm is provided with terminals or contacts 13 and which are shown as adjustably mounted on the arm 11, and adapted to move into and out of engagement with electrical terminal or contacts 14 and 14' carried by an arm 15. The arm 15 is fulcrumed on and is free to turn about the shaft 10, and, as shown, it is secured to the stem 16 of a control valve 17.

The stem 16 is screw threaded throughout a portion of its length and is engaged by the threaded hub 18 of a worm wheel 19. The worm wheel meshes with a worm 20 (clearly shown in Figs. 2 and 5) which is mounted on the shaft 21 of motor 22. As shown, the motor is a three-phase motor and is associated with a wiring diagram illustrating the control circuits.

During the operation of the apparatus a change in the opposed fluid pressures acting on the piston 4 which causes that piston to move downwardly will move the arm 11 downwardly, thereby moving the contact 13 into electrical contact with the terminal or contact 14', and completing an operating circuit of the motor 22 and the motor will operate to further open the valve 17.

With the parts in the position described, current from the power line enters through the power lead 23, passes through the terminals 13 and 14', wire 24, solenoid coil 25, wire 26, to the power lead 27.

The solenoid 25, which is included as a part of an automatic switch 28 is energized by the closing of the circuit just described and operates to close the switch 28 and deliver current to the motor 22. The closing of the switch 28 establishes electrical connection between the motor 22 and the power leads 23 and 27, the motor being in permanent electrical connection with the power lead 30. The closing of this switch establishes direct electrical connection between the lead 27 and the wires 29 and also direct electrical connection between the lead 23 and the wire 31 through wiring 32, 33 and 34. As has been stated, this will cause the motor 22 to run in such a direction that the valve stem 16 will be lifted by the operation of the worm wheel 19.

In order to prevent spasmodic delivery of current to the motor by fluctuations of the arm 11, we have provided a snap switch 35 which operates to maintain the energizing circuit of the solenoid 25 closed, independently of the position of the arm 11 after the worm wheel 19 has moved a predetermined amount in response to the operation of the motor. As shown, the switch 35 is permanently electrically connected to wiring 36 and it is adapted to be held by a spring 37 in engagement with a stationary terminal 38 for the purpose of completing the circuit between the leads 23 and 27 through wiring 39—36, arm 37 of the switch 28, solenoid 25 and wiring 26. The switch 35 is adapted to be opened by means of a finger 40 movably mounted in the casing of the worm wheel 19 and adapted to be actuated to open the switch by lugs 41 mounted on the worm wheel 19.

Any number of lugs 41 may be provided on the worm wheel 19 but it is preferable that they be equally spaced so as to insure a definite predetermined movement of the valve stem 16 whenever the motor operating circuit is complete by the movement of the arm 15, and the consequent automatic action of the switch 28.

The contact 14 of this arm 15 is electrically connected to a solenoid 42 of an automatic switch 43 which corresponds in details of construction to the automatic switch 28 and is so associated in circuits including the motor and the snap switch 35 that it functions in the manner described in connection with the automatic switch 28, when the contact 13 engages the contact 14, except that the closing of the switch 43 causes the motor 22 to run in the opposite direction, from that described in connection with the closing of the switch 28, and therefore occasions a closing movement of the valve 17.

From the foregoing it will be apparent that the operation of the apparatus is as follows: A variation in the opposed pressures acting on the piston will cause the arm 11 to swing in one direction or the other and move the terminal 13 into contact with one or the other of the terminals 14 or 14'. If we assume that such a movement takes place while the snap switch 35 is held open by the mechanically actuated finger 40 and if we further assume that the contacts 13 and 14' are moved into contact by the movement of the piston 4 it will be apparent that the solenoid 25 of the switch 28 will be energized thereby throwing the switch 28 to deliver operating current to the motor 22. The motor then drives the worm 20 thereby rotating the worm wheel 19 and lifts the valve stem 16. As soon as the wheel 19 moves a determined amount the finger 40, dropping off of the lug 41, permits a closing of the switch 35 in response to the pull of its operating spring 37. This insures a continuation of energizing current through the solenoid 25, and holds the switch 28 closed, and thereby insures the continued operation of the motor 22 until the finger 40 is again engaged by one of the lugs 41 and moved upwardly to open the switch 35.

As the valve stem 16 lifts, in response to the operation of the motor 22, the arm 15 is turned by it about its fulcrum on the shaft 10 and consequently the terminal 14' tends to move downwardly away from the contact 13 and will move away from that contact as soon as the opposing pressures acting on the piston 4 are equalized. The breaking of the circuit between the terminals 13 and 14' will have no effect on the automatic switch 28 nor on the operation of the motor 22 unless the switch 35 is open; consequently the motor 22 will continue to open the valve 17, even after the terminal 14' has moved out of contact with the terminal 13 and until the finger 40 is engaged by one of the lugs 41 and moves to open the snap switch 35. As soon as this occurs the energizing circuit of the solenoid 28 opens, breaking the motor operating circuit.

In the drawings we have disclosed a limit switch 44 which is diagrammatically disclosed at 44' and 44'' in the wiring diagram. As illustrated this switch is so placed that one or the other of its elements is adapted to be engaged by one of the collars 16ᵃ of the valve stem when the valve stem has reached either the upper or lower limit of its movement. As shown in the wiring diagram this switch is so connected to the coils of the solenoids 25 and 42 that when open it will break the energizing circuit of one or the other of these coils independently of the position of the arm 15 or the snap switch 35 and will thereby insure the opening of the automatic switches 28 or 43, which is effective in supplying current to the motor.

In Fig. 2 we have diagrammatically illustrated an auxiliary air motor 45 on the shaft 21 of the worm 20 for the purpose of opening or closing the valve 17 when the motor 22 is not in operation. This air motor is adapted to be manually controlled and is employed as a convenient means of avoiding the necessity of manually operating the valve stem 16 in case the motor 22 is for any reason out of commission.

In Figs. 3, 4 and 5 we have illustrated apparatus actually employed for controlling the delivery pressure of feed water and for maintaining that pressure a predetermined amount above boiler pressure. One of the essential features of such apparatus is that it is sensitive enough to respond to appreciable changes in the opposing fluid pressures operating on the piston 4 and at the same time be positive and dependable in operation. In order to obtain such apparatus it is necessary to reduce the friction between the parts moved by the piston 4 to a minimum.

Experiments have demonstrated that the friction between a shaft and a stuffing box are materially reduced where the shaft rotates instead of reciprocates in the box. Experiments further demonstrate that the amount of friction between a rotating shaft and its stuffing box decreases with a reduction in diameter of the shaft. For these reasons, the connection between the piston rod 8 and the shaft 10 are enclosed within an extension 5ᵃ of the cylinder 5, and the shaft 10 extends through stuffing boxes 10ᵃ and 10ᵇ located on either side of the extension. These stuffing boxes moreover function as bearings for the shaft, although separate bearings may be provided if desired. The shaft is also reduced in diameter so as to minimize the friction of rotation in the stuffing boxes 10ᵃ and 10ᵇ and so as to thereby provide a mechanism which will respond to slight variations in the opposing pressures to which the piston 4 is subjected.

In order to vary the sensitiveness of the mechanism or the degree of unbalanced pressure on the piston 4 to which it will respond, we have provided an adjustable friction clutch or brake mechanism 48 which may be employed in imposing a retarded friction on the shaft, thereby preventing the mechanism from responding to slight or immaterial fluctuations in steam pressure which may occur during normal operating conditions and also make it possible to adjust the mechanism so that the degree of regulation may be varied.

As illustrated the clutch 48 consists of an annular fiber disc 49 held against rotation by a bracket 50 mounted on the frame of the mechanism. This disc is located between a disc 51 rigidly mounted on the shaft 10 and a disc 52 which is movable longitudinally of the shaft and is held against the disc 49 by a coil spring 53 which surrounds the shaft 10 and is located between the disc 52 and an adjustable nut 54 threaded on to the outer end of the shaft. With this arrangement the frictional engagement between the disc 49 and the discs 51 and 52 can be varied by moving the nut 54 to different positions, and consequently the degree of sensitiveness of the apparatus may be varied. By employing the friction clutch or brake, just described, the degree of regulation of the mechanism may be quickly varied between wide limits, by merely turning the nut 54.

Another feature of the invention is the arrangement of the contacts 14 and 14' on the arm 15. It will be apparent that the force moving the piston 4 and consequently to which arms 9, 11 and 15 and the shaft 10 is subjected may, under extraordinary conditions be excessive or of sufficient magnitude to damage the mechanism.

It will, of course, be apparent that if the forces acting on the piston 4 are unbalanced, the piston will tend to move the extreme limit of its movement in response to the unbalanced force and that such movement is only prevented by the engagement of the arm 11, or the terminal 13 carried by it, with one or the other of the terminals 14 and 14' carried by the arm 15, which, as has been said, is operatively coupled to the valve stem 16. If for any reason, one or the other of the fluid pressures acting on the piston 4 is materially reduced below pressures ordinarily encountered under normal operating conditions, the shaft 10 and the connected devices may be subjected to forces such as will damage the mechanism.

In order to prevent injury to the mechanism under such extraordinary conditions, the contact terminals 14 and 14' are mounted on hinged extensions 15$^a$ and 15$^b$ of the arm 15 which are yieldingly held in normal operative positions with relation to the arm 15, with sufficient force to maintain these positions under forces encountered during the normal operation of the mechanism and of the associated apparatus. This is accomplished in the apparatus illustrated by hinging the extensions or fingers 15$^a$ and 15$^b$ on the arm 15 in such a way that they are capable of moving outwardly with relation to each other under the influence of force applied through the contact terminal 13 by the arm 11. These extensions are subjected to spring pressure for the purpose of holding them in the normal operative position with relation to the arm 15, and this pressure is sufficient to resist independent movement of either of the arms under the forces normally encountered during the normal operation of the mechanism and the associated apparatus. In Fig. 1 a single coil spring 55 is employed. It is located between the fingers 15$^a$ and 15$^b$ and normally holds them against lugs formed on the arm 15, with sufficient force to resist normal strains encountered.

If, however, the shaft 10 is subjected to abnormal strains due to failure or partial failure of the fluid pressure acting on either side of the piston 4, the spring will yield and prevent the full force of the piston being exerted on the shaft 10.

In Fig. 3 a separate spring 56 is employed for each finger. As shown, each spring 56 is coiled at its confined end and is secured to a trunnion 57, which is journaled on the arm 15. Each trunnion 57 is provided with a ratchet wheel 57$^a$ which may be employed for turning the trunnion and thereby varying the tension of the attached spring. As shown each wheel 57$^a$ is adapted to be secured in different or adjusted positions by means of a pin 58, which is removably mounted on the arm 15 in a position to engage one of the ratchets of the wheel.

As shown, each finger 15$^a$—15$^b$ is provided at its outer end with an insulating bar on which the contact 14 or 14' is mounted and the contact 13 is similarly insulated from the arm 11.

In Fig. 3 we have also shown a special form of the limit switch 44. As there illustrated the switch consists of two arms 44$^a$ and 44$^b$ which are fulcrumed on a bracket 44$^c$ carried by the frame of the mechanism. The short arm of each of these fingers is located in the line of travel of one of the shoulders 16$^a$ of the valve stem 16 and the arms are held in the normal circuit closing position by means of a coil spring 44$^d$. With this arrangement the contacts 44' and 44" carried by the arms 44$^a$ and 44$^b$, respectively are normally held in engagement with the contact 59, which is electrically connected to the wire 26 shown in the wiring diagram of Fig. 1. With such an arrangement the spring 44$^d$ not only holds the switch in the closed position but it also takes up lost motion around the fulcrums of the arms 44$^a$ and 44$^b$ so that the engagement of either of the shoulders 16$^a$ with either of the arms immediately moves the engaged arm to break the energizing circuit of one or the other of the solenoids 25 and 42.

While we have not as specifically illustrated the automatic switches 28 and 43, it will be understood that each of these switches may be of the ordinary construction employed where a solenoid is utilized to move the switch to the circuit-closing position. It is also preferable to interlock the two switches 28 and 43 in such a way that one only can be moved to the circuit closing position at a time.

In Figs. 3, 4 and 5 the valve 17 is not illustrated but it will be readily understood that the valve stem 16 may control either a valve in the feed water line or a valve in the steam line of the engine or turbine driving the feed water pump, and that in either case variations in the position of the valve will occasion variations in the pressure to which the piston 4 is subjected.

Any suitable coupling may be employed between the screw threaded portion of the valve 16 and the valve stem proper. In the drawings a combination cross head guide and coupling 60 is illustrated for coupling the screw threaded portion of the stem 16 to the stem proper of the valve 17. As shown, the coupling is provided with outwardly extending wings 60$^a$ which engage ways formed in brackets 61 connecting the valve cover to the frame of the mechanism.

A further feature of the apparatus, herein illustrated, is an alarm signal for indicating abnormal pressure conditions within the cylinder 5.

As shown the signal is adapted to operate when one or the other of the fingers 15$^a$ or 15$^b$ move in opposition to their holding springs 56 (Fig. 3) and in response to force imparted by the arm 11. In Fig. 6 the alarm is diagrammatically shown as an electric bell 63 which is located in a bell ringing circuit including a spring terminal 64 and a rigid terminal 65, both terminals being carried by the arm 15 and both being substantially U-shaped. The spring terminal 64 is located within the terminal 65 and its outer ends are yieldingly held against insulating blocks 64$^a$ and 64$^b$ carried by the fingers 15$^a$ and 15$^b$ respectively, and so arranged that a slight yielding of either of the springs 56 will permit contact between the terminals 64 and 65 and thereby complete the alarm circuit.

With this arrangement the alarm signal will indicate abnormal conditions such as occasioned by either a failure of the regulated fluid pressure, or the controlling fluid pressure, and will therefore warn of conditions which if they persisted might damage the apparatus.

While we have illustrated and described what we now believe to be the preferred form of apparatus embodying our invention, it will be apparent to those skilled in the art that various changes, additions, modifications and omissions may be made in the apparatus illustrated without departing from the spirit and scope of the invention as set forth by the appended claims.

What we claim is:

1. A pressure regulator comprising a member movable in response to unbalance fluid pressure, means controlled by said member for varying the fluid pressure, and an instrumentality actuated by said means for rendering said member ineffective as a controlling agent as the fluid pressure is counterbalanced independently of the position and movements of said member.

2. A pressure regulator comprising a member subjected to opposed fluid pressures, one of which is to be regulated, and movable in response to variations in one or the other of said opposed pressures, an instrumentality actuated by said member, a second instrumentality and means controlled by cooperation of said instrumentalities for varying the pressure to be regulated and for periodically moving said second instrumentality out of cooperative relation with the first mentioned instrumentality.

3. A pressure regulator comprising a member movable in response to variations in one or another of two opposed fluid pressures, one of which is to be regulated, apparatus for controlling the pressure of the fluid to be regulated, means controlled by said member and responsive to movements of said apparatus for controlling the operation of said apparatus, and means controlled by extreme movements of said apparatus for rendering said first mentioned means ineffective as a controlling means for said apparatus.

4. In a fluid pressure regulator, apparatus for controlling the pressure of the fluid to be regulated, a member subjected to opposed fluid pressures, one of which is the pressure to be regulated, means controlled by said member for actuating said apparatus to vary the pressure of the fluid to be regulated, and means actuated by said apparatus for stopping said first mentioned means independently of said member.

5. In a fluid pressure regulator, apparatus for controlling the pressure of the fluid to be regulated, a member movable in response to variations in the pressure of said fluid, an electric motor for actuating said apparatus to vary the pressure of said fluid, an arm actuated by said member, a second arm actuated by said apparatus and cooperating electric terminals carried by said arms for controlling the operation of said motor.

6. In a fluid pressure regulator, apparatus for controlling the pressure of the fluid to be regulated, a member movable in response to the pressure of said fluid, an electric motor for actuating said apparatus to vary the pressure of said fluid, an arm actuated by said member, a second arm actuated by said apparatus, cooperating electric terminals carried by said arms for controlling the operation of said motor, a yielding connection between said arms, and an alarm signal responsive to the yielding of said connection.

7. In a pressure regulator, a piston movable in response to variations in the pressure to be regulated, apparatus for varying the pressure to be regulated, a rotatable shaft, an operative connection between said shaft and said piston, an arm rigidly mounted on said shaft, an electric terminal carried by the free end of said arm, a second arm pivotally mounted on said shaft and operatively coupled to said apparatus, electric terminals carried by the free end of said second arm and cooperating with said first mentioned terminal, a motor for actuating said apparatus, circuits including said terminals for controlling the operation of said motor and a yielding connection between one of said terminals and its supporting arm.

8. In a pressure regulator, a member movable in response to the pressure to be regulated, apparatus for varying pressure to be regulated, an electric motor for actuating said apparatus, means actuated by said member, means actuated by said apparatus cooperating the electric terminals carried by both of said means for opening and closing control circuits of said motor, and a switch actuated by said apparatus for maintaining said control circuits closed independently of said terminals.

9. In a pressure regulator, a member movable in response to variations in the pressure of the fluid to be regulated, a rotatable shaft operatively coupled to said member, an arm rigidly mounted on said shaft, apparatus for controlling the pressure of the fluid to be regulated, an arm operatively coupled thereto and journalled on said shaft, an electric motor for actuating said apparatus, control circuits for said motor, terminals carried by said arms and located in said control circuits, and a friction brake for retarding said shaft.

10. In a pressure regulator, a piston subjected to the pressure of the fluid to be regulated, an arm actuated by said piston, apparatus for controlling the pressure of the fluid to be regulated, an arm operatively coupled to said apparatus, an electric motor for actuating said apparatus, control circuits for said motor, terminals included in said circuits and mounted on said arms for controlling the operation of said motor, a switch actuated by said apparatus for periodically closing said control circuit during the operation of said apparatus, independently of the position of said terminals and a limit switch operated by said apparatus for opening said control circuits independently of the positions of said terminals.

11. In a pressure regulator, a piston movable in response to variations in the pressure of the fluid to be regulated, a rotatable shaft operatively connected to said piston, fluid packings through which said shaft extends, control devices mounted on said shaft, and a brake engaging said shaft for retarding its movement.

12. A pressure regulator comprising a member subjected to opposed fluid pressures one of which is to be regulated, and movable in response to variations in one or the other of the opposed pressures, instrumentalities controlled by the movement of said member for varying the pressure of the fluid to be regulated, and means actuated thereby for insuring a predetermined movement of said instrumentalities, after movement is initiated by said member.

13. A method of automatically maintaining a substantially constant relation between the pressure of a fluid to be regulated, and the pressure of a second fluid, which consists in gradually varying the pressure of the fluid to be regulated in response to variations in the relation of the pressures of said fluid to the pressure of the second fluid, and continuing such gradual variation of the pressure of the fluid to be regulated for a definite period independently of variations in the relations of the pressures of the two fluids.

14. A method of automatically maintaining the pressure of one fluid a predetermined amount in excess of the pressure of a second fluid, which consists in subjecting a movable member to the pressures of said fluids in opposed relation, in controlling the delivery of the fluid to be regulated in response to movements of said member occasioned by variations in one or the other of the opposed pressures to which it is subjected, by actuating a regulating device to gradually increase or decrease the pressure of the fluid to be regulated, and in continuing a movement of said regulating device initiated by said member independently of subsequent movements of said member until said device has moved a predetermined amount.

15. A pressure regulator comprising a member movable in response to variations in fluid pressure to be controlled, means for controlling the pressure of said fluid, an instrumentality actuated by said member for controlling the operation of said means, and a second instrumentality actuated by movements of said means for rendering said first-mentioned instrumentality ineffective in controlling said means independently of the position and movements of said member.

16. A pressure regulator comprising a member movable in response to variations in fluid pressure to be controlled, means for controlling the pressure of the fluid to be controlled, an instrumentality actuated by said member, an instrumentality actuated by said means, and means responsive to the co-operative action of said instrumentalities for actuating said pressure controlling means.

17. In a fluid pressure regulator, a member movable in response to variations in fluid pressure, a device for controlling such fluid pressure, an instrumentality actuated by said member, a second instrumentality, co-operating electrcial contacts carried by said instrumentalities, a motor for actuating said device, a control circuit for said motor including said electrical contacts, and means actuated by said device for moving said second instrumentality to open said circuit.

18. Apparatus for maintaining a predetermined relation between the pressures of two fluids, comprising a member movable in response to variations in said fluid pressure relation, apparatus controlled by movements of said member for varying the pressure of one of said fluids, and means actuated by said apparatus for continuing movements of said apparatus for a predetermined interval independently of the operation of said member.

19. Apparatus for maintaining a predetermined differential between the pressures of two fluids comprising a member movable in response to variations in such differential, apparatus controlled by movements of said member for gradually varying the pressure of one of said fluids, and means actuated by movement of said apparatus for continuing the movement of said apparatus to continue the gradual variation in fluid pressure a predetermined amount independently of the operation of said member.

20. Apparatus for maintaining a predetermined differential between the pressures of two fluids, comprising a member movable in response to variations in such differential, apparatus for varying the pressure of one of such fluids, co-operating instrumentalities, one actuated by said member and one by said apparatus, for controlling the operation of said apparatus, and means periodically rendered inoperative by movement of said apparatus for continuing movement of said apparatus initiated by said instrumentalities, independently of the operation of said instrumentalities.

21. Apparatus for maintaining a predetermined differential between the pressures of two fluids, comprising a member movable in response to variations in such differential, apparatus for varying the pressure of one of such fluids, an instrumentality actuated by said member, a second instrumentality actuated by said apparatus, a motor for actuating said apparatus, a control circuit for said motor, co-operating electrical contacts carried by said instrumentalities for opening and closing said circuit, and means periodically rendered operative by movement of said apparatus for periodically rendering said instrumentalities ineffective in controlling said circuit.

22. Apparatus for maintaining a predetermined differential between the pressures of two fluids, comprising a member subjected on opposite sides to the opposed pressures of said fluids, apparatus controlled by movements of said member for gradually varying the pressure of one of said fluids, and means actuated by a movement of said apparatus for continuing the gradual variation in pressure of said fluid a predetermined amount independently of the operation of said member.

23. Apparatus for maintaining a predetermined differential between the pressures of two fluids comprising a member subjected to the pressures of said fluids in opposed relation, apparatus controlled by the movements of said member for gradually varying the pressure of one of said fluids, and means periodically rendered inoperative by movements of said apparatus for continuing the movement of said apparatus throughout a predetermined range independently of the movement of said member.

24. Apparatus for maintaining a predetermined differential between the pressures of two fluids comprising a member subjected to the pressures of said fluids in opposed relation, apparatus controlled by the movements of said member for gradually varying the pressure of one of said fluids, an instrumentality actuated by said apparatus for rendering said member ineffective as a controlling means for said apparatus, and means periodically rendered ineffective by said apparatus for continuing the movements of said apparatus initiated by said member throughout a definite range and independently of the operation of said member or said instrumentality.

In testimony whereof, we have hereunto subscribed our names this 17th day of April, 1924.

LEWIS E. HANKISON.
WESLEY M. STEPHENS.